J. T. SMITH.
ATTACHMENT FOR THRESHING MACHINES AND BALING PRESSES.
APPLICATION FILED APR. 9, 1917.

1,320,717.

Patented Nov. 4, 1919.
4 SHEETS—SHEET 1.

WITNESSES:
B. Hall.
C. E. Sorensen

INVENTOR:
JOHN T. SMITH
BY
Paul & Paul
ATTORNEYS.

J. T. SMITH.
ATTACHMENT FOR THRESHING MACHINES AND BALING PRESSES.
APPLICATION FILED APR. 9, 1917.
1,320,717.
Patented Nov. 4, 1919.
4 SHEETS—SHEET 4.
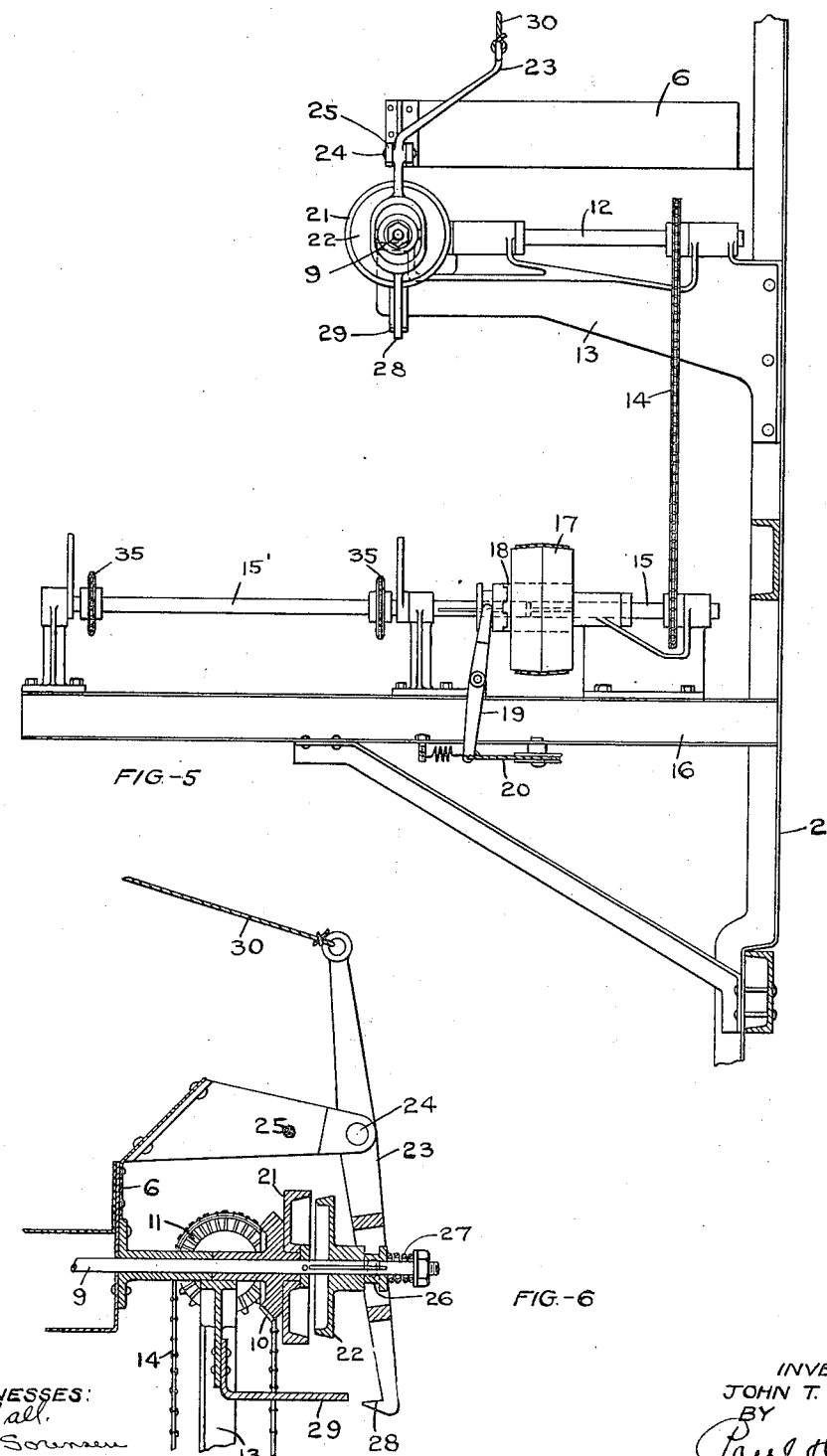
WITNESSES:
B. Hall.
Q. E. Sorensen
INVENTOR:
JOHN T. SMITH.
BY
Paul & Paul
ATTORNEYS.

UNITED STATES PATENT OFFICE.

JOHN T. SMITH, OF HOPKINS, MINNESOTA.

ATTACHMENT FOR THRESHING-MACHINES AND BALING-PRESSES.

1,320,717.  Specification of Letters Patent.  Patented Nov. 4, 1919.

Application filed April 9, 1917. Serial No. 160,786.

*To all whom it may concern:*

Be it known that I, JOHN T. SMITH, a citizen of the United States, resident of Hopkins, county of Hennepin, State of Minnesota, have invented certain new and useful Improvements in Attachments for Threshing-Machines and Baling-Presses, of which the following is a specification.

The object of my invention is to provide an attachment for a threshing machine by means of which clean straw may be taken from the racks of a threshing machine and delivered to the baling chamber of the press, while the chaff and other refuse is discharged from the threshing machine through the usual windstacker.

A further object is to provide an apparatus by means of which the straw can be baled as fast as the grain is threshed out, the straw passing automatically from the cylinder of the threshing machine direct to the baling press without hand labor, and the press having a draft connection with the threshing machine and also belted thereto so that it can be hauled around as one machine without loss of time or labor and without the necessity of having an extra engine and engineer, usually required for a baling press.

A further object is to provide an attachment by means of which the material, when baled, will have a greater market value on account of the removal of the chaff and other refuse therefrom, and the chaff and broken seed that is passed out through the blower in condensed form will be good feed for stock.

A further object is to provide an apparatus which will render the work of baling much cleaner and easier for the men employed.

Other objects of the invention will appear from the following detailed description.

The invention consists generally in various constructions and combinations, all as hereinafter described and particularly pointed out in the claims.

Figure 1:
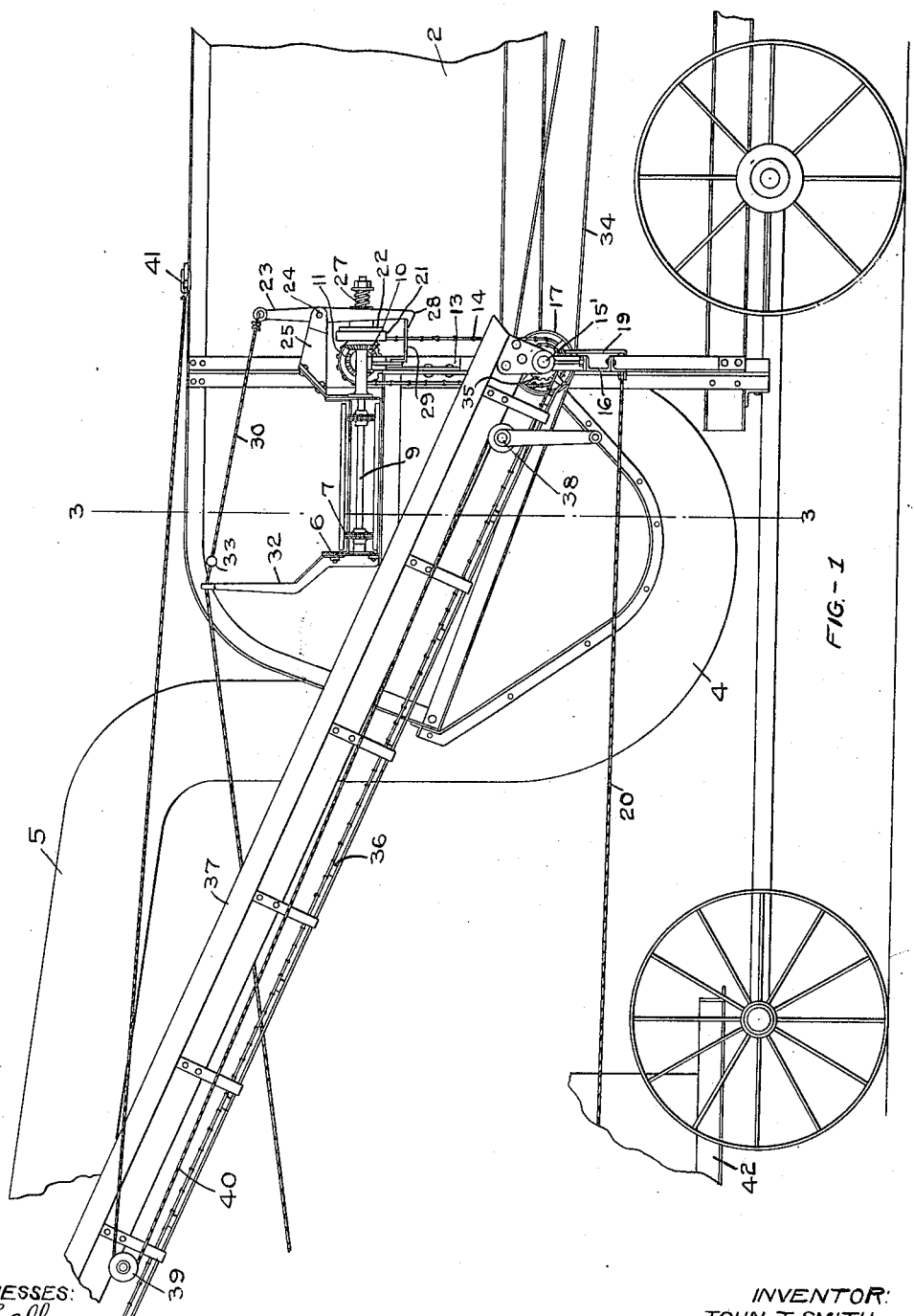
Figure 2:
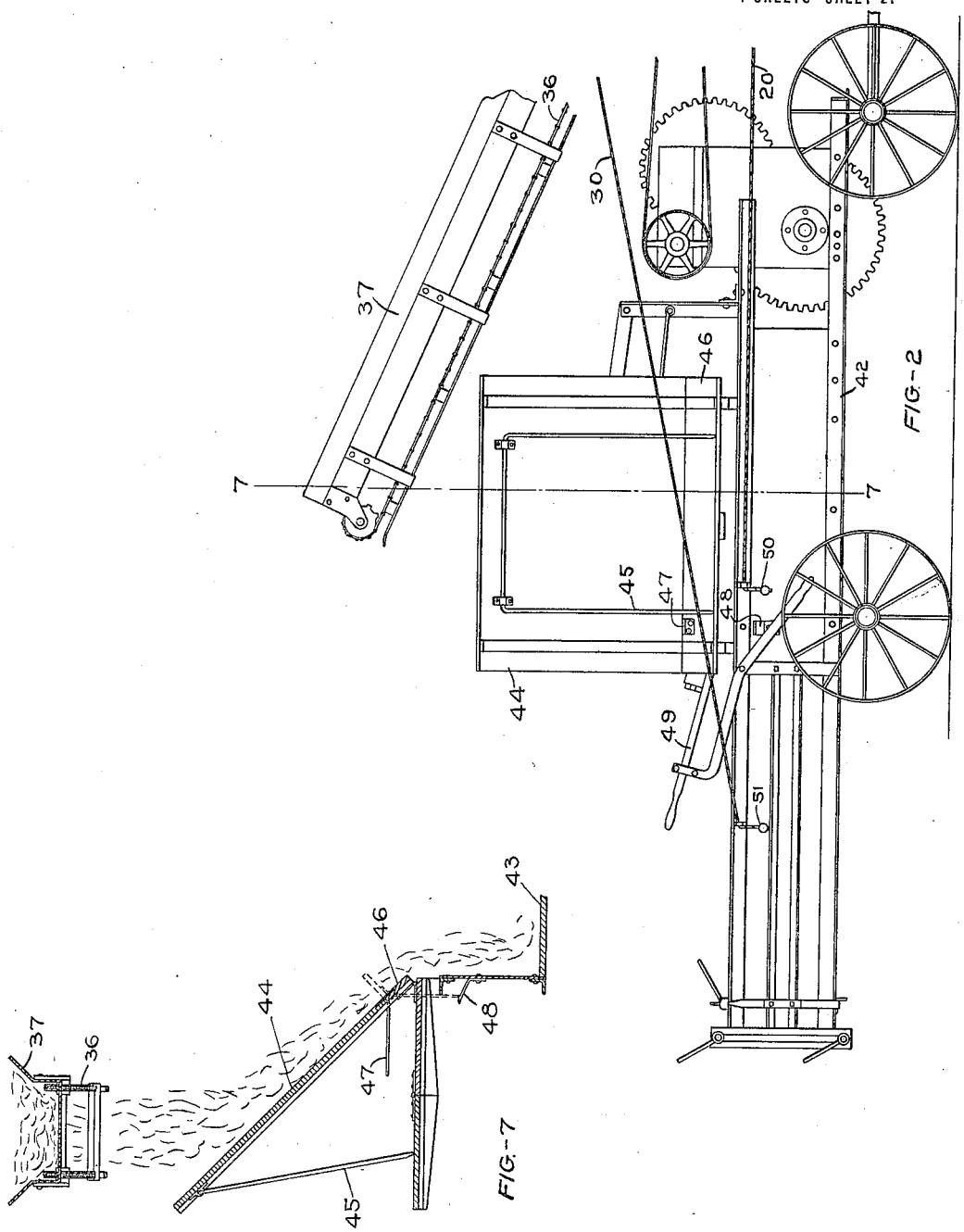
Figure 3:
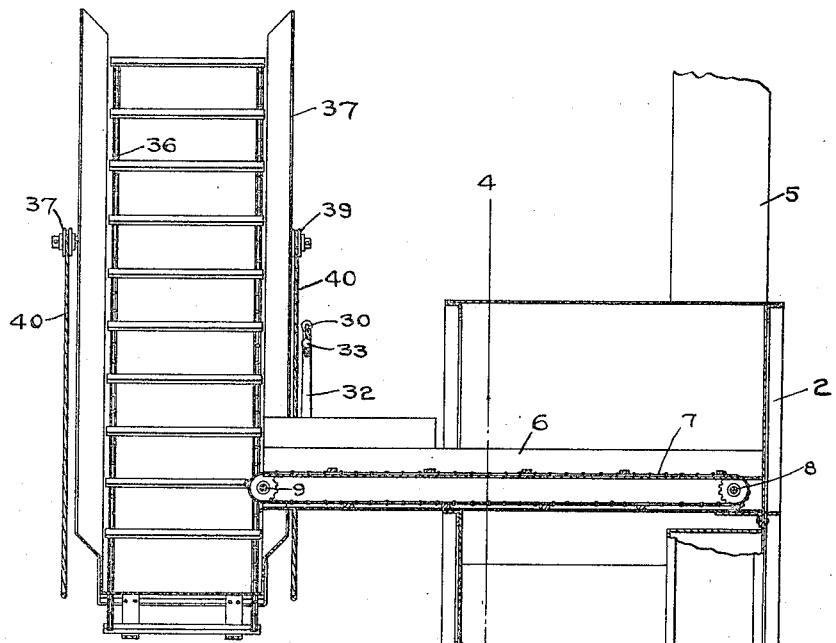

In the accompanying drawings forming part of this specification,

Figure 1 is a side elevation of a portion of a threshing machine and baling press, with my invention applied thereto, Fig. 2 is a continuation of the view shown in Fig. 1, showing the discharge end of the conveyer or apron overhanging the hopper of the baling press, Fig. 3 is a detail view, showing the relative position of the conveyers for receiving the straw from the threshing machine racks and delivering it to the baling press.

Figure 4:
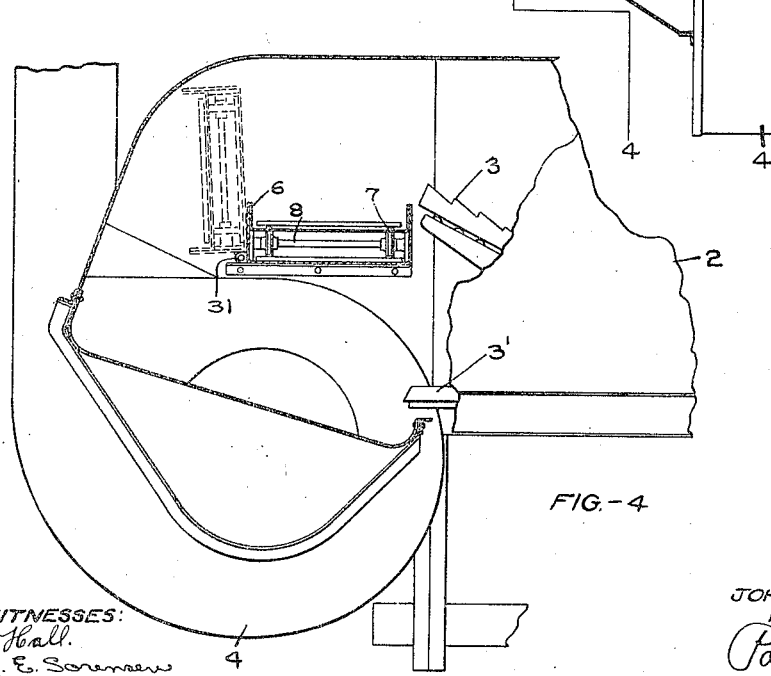

Fig. 4 is a detail view, showing the manner of tilting the conveyer in the threshing machine to render it temporarily inoperative for delivering straw to the baling press, Figs. 5 and 6 are detail views of the mechanism for controlling the movement of the straw carrier, Fig. 7 is a sectional view on the line 7—7 of Fig. 2.

In the drawing, 2 represents a threshing machine of ordinary construction, equipped with the usual straw racks 3, chaffer 3′, and a blower hopper 4 having a spout 5 leading therefrom to the stack. This hopper in machines of this kind as ordinarily constructed receives the straw and chaff from the racks for delivery through the spout or straw stacker, as it is usually termed, to some point at a distance from the machine. If it is desired to bale the straw, it has been customary to locate a baling press near the stack and pitch the straw and chaff mixed with it into the hopper of the press. The objection to this manner of baling is that a great quantity of dust and chaff will be mixed with the clean straw and the bale will not be as valuable commercially as it would if it contained nothing but clean straw. Then, too, the pitching of the straw with the dust and chaff therein is very dirty work and not only requires a number of men, but it is difficult to employ men who are willing to engage regularly in such occupation.

To obviate this difficulty and objection to the ordinary method of baling, I provide a carrier frame 6 within the threshing machine frame and above the stacker hopper, having a conveyer 7 provided with shafts 8 and 9 mounted in said frame. The shaft 9 is extended and has a beveled gear 10 thereon meshing with a driving gear 11 on a shaft 12 that is journaled in a bracket 13 on the frame of the threshing machine and is driven through a belt 14 from a shaft 15 supported in bearings on a bracket 16. The shaft 15 has a driven pulley 17 and a clutch 18 by means of which the pulley may be locked on the shaft or released by the movement of a lever 19 to which the operating cable 20 is attached. The gear 10 is provided with a clutch member 21 and a clutch member 22 is splined on the shaft 9 for engagement with the member 21 to lock or release it and render the gear 10 idle or active, as may be desired. A lever 23 is pivoted at 24 on a bracket 25 and engages the clutch member 22 at 26 and is normally held with said clutch member 22 toward the member 21 by the tension of a compression spring 27. The lower end of the lever 23 has a hook 28 thereon for engagement with a bracket 29 on the frame of the machine for holding the parts in place when the conveyer is at work. A cable 30 is attached to the upper end of the lever 23 by means of which it may be oscillated to set the clutch and start the conveyer. The conveyer frame is hinged at 31 on longitudinal pivot pins and an arm 32 projects upwardly from said frame and has a guide therein for the cable 30. A stop 33 is mounted on this cable in position to engage the arm 32 and rock the conveyer frame to an upright inactive position, as indicated by dotted lines in Fig. 4. When the operator pulls the cable a sufficient distance, the initial movement of this cable will release the clutch and stop the conveyer and then, if the operator desires to discharge both the straw and the chaff into the blower hopper beneath, he will draw on the cable 30 to rock the arm 32 and thereby tilt the conveyer out of the path of the straw and chaff and allow it to be all discharged into the hopper beneath.

The pulley 17 is driven through a belt 34 and the shaft 15 projects outwardly in a horizontal direction from the sides of the machine and has sprocket wheels 25 thereon for a conveyer 36 having its receiving end beneath and adjacent to the discharge end of the conveyer 7 to receive the clean straw therefrom. A conveyer frame 37 is mounted on the shaft 15 and in which frame the conveyer 36 operates. Means for raising and lowering this conveyer frame 37 is provided through the windlass device 38, the sheave 39 on the frame and the cable 40 passing around said sheave to a point 41 on the threshing machine. By operating the windlass the upper discharge end of the elevating conveyer can be raised or lowered.

In the rear of the threshing machine and having a connection therewith for convenient transportation from place to place I provide a baling press 42 of ordinary construction, having a baling chamber 43 and a guide-board 44 positioned beneath the discharge end of the conveyer 36 and supported by hinged braces 45 by means of which the angle of inclination of the guide-board can be varied. At the lower end of the guide-board is a hinged section 46 having an arm 47 thereon for engaging a spring catch 48 to hold the hinged section at right angles substantially to the surface of the guide-board when it is desired to temporarily stop the flow of straw into the baling chamber, as when the follower boards are being put in place.

49 represents a lever mechanism by means of which the movement of the follower boards are controlled and 50 and 51 are hand grips for the cables 20 and 30, by means of which the movement of the levers 19 and 23 are controlled. One man will put the wire through the follower and tie it around the bales and control the lever for dropping the follower into the press and will also control the means for conveying the straw from the threshing machine to the press, and I am therefore able to dispense with the services of one man usually required to feed the straw into the press by hand and drop the follower in the usual way from the top of the feed platform.

In the operation of the apparatus, the conveyer 7 having been adjusted in its working position and set in motion, will receive the straw from the racks, while the chaff and other fine refuse will be discharged into the blower hopper beneath the conveyer and from thence delivered to the straw stacker in the usual way. The clean straw passing out to the elevating carrier will be conveyed thereby upwardly to a point above the hopper of the baling press and upon reaching this point will be discharged into the press in the path of the baling plunger. I am thereby able to not only effect a considerable saving in labor usually required to operate machines of this type, but can produce a cleaner and more marketable bale of straw than by the usual methods.

When the machines are located for a considerable time in one place, I may dispense with the elevating conveyer and arrange the baling press at the side of the threshing machine so that the clean straw will be delivered directly by the cross conveyer from the threshing machine into the hopper of the baling press, but when the machines are to be moved from place to place and only used in one spot for a comparatively short time, I prefer to arrange them tandem, as shown in the drawings, and use the elevating carrier for taking the clean straw from the cross conveyer to the hopper of the press.

When the machines are positioned side by side, I may take flax straw brought in by the farmers after it has been threshed, about one-third of it being chaff with considerable loose flax mixed with it, and feed this in at the front end of the threshing machine. It is carried along through the machine and the straw delivered to the baling press automatically without handling, the loose flax seed being taken out while the chaff and dirt will fall down into the conveyer at the side of the separator.

I claim as my invention:

1. The combination, with a threshing machine having a straw support and blower, of a conveyer interposed between said blower and straw support for receiving the clean straw for delivery outside said machine independently of said blower, said conveyer being mounted for movement out of the path of the straw to permit it to mingle with the chaff and refuse in the blower.

2. The combination, with a threshing machine having a straw support and a blower, of a conveyer positioned to receive the clean straw from said support and deliver it at a point outside the machine, a second conveyer positioned to receive the clean straw from said first named conveyer, said first named conveyer being mounted to be moved out of the path of the straw to allow both the straw and the refuse material to be discharged from the straw support into said blower.

3. The combination, with a threshing machine having a straw support and a blower, of a conveyer positioned between said support and blower to receive the clean straw from said support while the refuse is discharged into said blower, said conveyer being mounted for tilting on a longitudinal axis from a horizontal to an upright position to allow both the straw and the chaff to be discharged into said blower, a second conveyer mounted to receive the clean straw from said first named conveyer.

4. The combination, with a threshing machine having a straw support and blower positioned to receive the straw discharged from the end of said support and the chaff falling through the same, of means mounted to receive the clean straw discharged over the end of said support for delivery outside the machine, said means being mounted for movement out of the path of the straw to allow it to mingle with the chaff in said blower.

5. The combination, with a threshing machine having a straw support and a blower, of a cross conveyer positioned between said straw support and blower to intercept the clean straw on its passage to the blower, a driven shaft geared to said conveyer, a clutch through which power is transmitted from said shaft to said conveyer, a second shaft journaled in the threshing machine frame below said conveyer, a driving pulley therefor, and a clutch for controlling said pulley, a driving belt connecting said second shaft with said first named shaft, said second shaft projecting outwardly beyond the side walls of the threshing machine, an elevating conveyer operated through the projecting portion of said second shaft and positioned to receive the clean straw from said cross conveyer, and means for controlling the clutches of said cross conveyer and said driving pulley.

6. The combination, with a threshing machine, its straw support and blower, of a cross conveyer positioned between the blower and said straw support, a clutch device for controlling the operation of said cross conveyer, said conveyer being hinged on one side for tilting to an upright inactive position when said clutch is released, a second conveyer whereto the clean straw is delivered by said cross conveyer, means for operating said clutch to stop or start said cross conveyer, said means having a device for tilting said cross conveyer on its pivots upon the continued movement of said operating means after the disengagement of said clutch.

7. The combination, with a threshing machine, its straw support, and blower, of a cross conveyer mounted between said straw support and blower to receive the clean straw and mounted for oscillation on a longitudinal pivot, an arm secured to the frame of said conveyer and projecting upwardly therefrom, a driving shaft geared to said conveyer, a clutch through which power is transmitted from said shaft to said conveyer and having a controlling lever, a second carrier positioned to receive the clean straw from said cross conveyer, a cable extending from a point adjacent the discharge end of the carrier to said clutch lever for starting or stopping said cross conveyer and said cable having a stop thereon for engaging the arm of said cross conveyer after the release of said clutch for tilting said cross conveyer to an upright, inactive position, whereby the straw as well as the chaff may be delivered to said blower or the straw may be separated from the chaff, as desired.

8. The combination, with a threshing machine having a straw support and blower positioned to receive the straw and chaff from said support and direct it out of the machine, of an apron interposed between said blower and said straw support to receive the clean straw and deliver it outside the threshing machine, said apron being mounted for movement out of the path of the straw to allow it to be discharged with the chaff into said blower.

9. The combination, with a threshing machine having a straw support and blower, of a conveyer mounted transversely of said machine and operating through an opening in the side wall thereof for receiving the clean straw from said support and delivering it outside said machine, said conveyer being mounted for movement out of the path of the clean straw to permit it to mingle with the chaff for delivery to said blower.

10. The combination, with a threshing machine having a straw support and straw and chaff blower and an opening in its side wall, of a frame mounted in said opening, an apron carried by said frame and having its receiving end positioned between said straw support and straw and chaff blower to divert the clean straw from said straw and chaff blower.

In witness whereof, I have hereunto set my hand this 6th day of April, 1917.

JOHN T. SMITH.

Copies of this patent may be obtained for five cents each, by addressing the "Commissioner of Patents, Washington, D. C."